(12) United States Patent
Kanao

(10) Patent No.: US 11,233,251 B2
(45) Date of Patent: Jan. 25, 2022

(54) FUEL CELL SYSTEM

(71) Applicant: HONDA MOTOR CO., LTD., Tokyo (JP)

(72) Inventor: Yukihisa Kanao, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/912,861

(22) Filed: Jun. 26, 2020

(65) Prior Publication Data
US 2021/0005907 A1 Jan. 7, 2021

(30) Foreign Application Priority Data
Jul. 1, 2019 (JP) .............................. JP2019-122898

(51) Int. Cl.
| | | |
|---|---|---|
| *H01M 8/04014* | (2016.01) | |
| *H01M 8/0612* | (2016.01) | |
| *H01M 8/04828* | (2016.01) | |
| *H01M 8/1253* | (2016.01) | |
| *H01M 8/04119* | (2016.01) | |
| *H01M 8/124* | (2016.01) | |

(52) U.S. Cl.
CPC ..... *H01M 8/04022* (2013.01); *H01M 8/0494* (2013.01); *H01M 8/04164* (2013.01); *H01M 8/0618* (2013.01); *H01M 8/1253* (2013.01); *H01M 2008/1293* (2013.01)

(58) Field of Classification Search
CPC ......... H01M 8/04022; H01M 8/04164; H01M 8/0494; H01M 8/0618
See application file for complete search history.

(56) References Cited

U.S. PATENT DOCUMENTS

| | | | |
|---|---|---|---|
| 2008/0113228 A1* | 5/2008 | Whyatt | ............... H01M 8/0612 429/414 |
| 2010/0173214 A1* | 7/2010 | Fabian | ............... H01M 8/04902 429/443 |
| 2012/0088169 A1* | 4/2012 | Nagatani | ........... H01M 8/04955 429/425 |

FOREIGN PATENT DOCUMENTS

JP 2013-073903 4/2013

* cited by examiner

*Primary Examiner* — Olatunji A Godo
(74) *Attorney, Agent, or Firm* — Amin, Turocy & Watson, LLP

(57) ABSTRACT

A supply channel through which an oxygen-containing exhaust gas discharged from a fuel cell stack is supplied to an exhaust gas combustor is branched so as to provide an oxygen-containing exhaust gas bypass channel through which the oxygen-containing exhaust gas is discharged to the outside in a manner to bypass the exhaust gas combustor. In the structure, the exhaust gas flow rate of an exhaust gas discharged through a condenser (saturated water vapor quantity) is suppressed.

7 Claims, 8 Drawing Sheets

FIG. 7

L: POWER GENERATION OUTPUT
Ld: REQUIRED POWER GENERATION OUTPUT
I: POWER GENERATION CURRENT

Qa: AIR FLOW RATE
Qb: OXYGEN-CONTAINING EXHAUST GAS BYPASS FLOW RATE
Qc: OXYGEN-CONTAINING EXHAUST GAS FLOW RATE
Ql: AIR FLOW RATE LOWER LIMIT
(OXYGEN UTILIZATION RATIO LIMIT)
Qh: AIR FLOW RATE UPPER LIMIT
(WATER SELF-SUSTAINING OPERATION LIMIT)
Qf: FUEL FLOW RATE
Qw: WATER FLOW RATE

Ts: STACK TEMPERATURE
Tl: STACK TEMPERATURE LOWER LIMIT
Th: STACK TEMPERATURE UPPER LIMIT

S: WATER TANK STORAGE QUANTITY
Sl: WATER SELF-SUSTAINING OPERATION ALARMING QUANTITY

FUEL CELL SYSTEM

CROSS-REFERENCE TO RELATED APPLICATION

This application is based upon and claims the benefit of priority from Japanese Patent Application No. 2019-122898 filed on Jul. 1, 2019, the contents of which are incorporated herein by reference.

BACKGROUND OF THE INVENTION

Field of the Invention

The present invention relates to a fuel cell system including a fuel cell stack formed by stacking a plurality of fuel cells which perform power generation by electrochemical reactions of a fuel gas and an oxygen-containing gas.

Description of the Related Art

In general, a solid oxide fuel cell (SOFC) employs a solid electrolyte. The solid electrolyte is an oxide ion conductor such as stabilized zirconia. The solid electrolyte is interposed between an anode and a cathode to form an electrolyte electrode assembly (MEA). The electrolyte electrode assembly is sandwiched between separators (bipolar plates). In use, generally, predetermined numbers of the electrolyte electrode assemblies and the separators are stacked together to form a fuel cell stack.

As the fuel gas supplied to the fuel cell stack of SOFC, normally, a hydrogen gas produced from hydrocarbon raw material by a reformer is used. In general, in the reformer, a reforming raw gas is obtained from a hydrocarbon raw fuel of a fossil fuel or the like, such as methane or LNG, and thereafter, the reforming raw gas undergoes, e.g., steam reforming, whereby a reformed gas (fuel gas) is produced.

The steam (water vapor) to be supplied to the reformer is produced as follows. That is, a fuel exhaust gas and an oxygen-containing exhaust gas discharged from the fuel cell stack are combusted in the exhaust gas combustor, and the resulting combustion gas passes through an evaporator to which water is supplied. Thus, the water vapor is produced.

In this case, as disclosed in Japanese Laid-Open Patent Publication No. 2013-073903 (hereinafter referred to as JPA2013-073903), the combustion gas containing water vapor is condensed in the condenser to produce water, and the produced water is collected into a water tank. In this manner, it is possible to perform water self-sustaining operation where there is no need to supplement water from the outside (paragraph [0003] of JPA2013-073903).

SUMMARY OF THE INVENTION

By the way, in the SOFC disclosed in JPA2013-073903, if the temperature of the fuel cell stack is high, in order to cool the fuel cell stack for the purpose of avoiding damage to the fuel cell stack, the supply flow rate of the oxygen-containing gas is increased (paragraph [0012] of JPA2013-073903).

However, if the supply flow rate of the oxygen-containing gas is increased, the quantity of water vapor contained in the combustion gas (exhaust gas) discharged from the condenser is increased, and the quantity of water collected into the water tank is decreased. Consequently, it becomes difficult to perform water self-sustaining operation.

Further, if the supply flow rate of the oxygen-containing gas is increased, the combustion temperature of the combustion gas in the exhaust gas combustor is decreased. Consequently, degradation of emission and/or accidental fire may occur.

The present invention has been made taking the above problems into account, and an object of the present invention is to provide a fuel cell system which makes it possible to maintain water self-sustaining operation, avoid damage to a fuel cell stack, and also avoid occurrence of degradation of emission and accidental fire in an exhaust gas combustor.

A fuel cell system according to an aspect of the present invention includes a fuel cell stack including a plurality of fuel cells stacked together, the fuel cells being configured to perform power generation by electrochemical reactions of a fuel gas and an oxygen-containing gas, a reformer configured to perform steam reforming of raw fuel chiefly containing hydrocarbon to generate the fuel gas supplied to the fuel cell stack, an exhaust gas combustor configured to generate a combustion gas by combusting a fuel exhaust gas and an oxygen-containing exhaust gas discharged from the fuel cell stack, a heat exchanger configured to perform heat exchange between the combustion gas and the oxygen-containing gas, an oxygen-containing gas supply channel configured to supply the oxygen-containing gas to the fuel cell stack through the heat exchanger, a condenser configured to condense water vapor in the combustion gas and collect water, and a control unit configured to control the power generation. A supply channel through which the oxygen-containing exhaust gas discharged from the fuel cell stack is supplied to the exhaust gas combustor is branched so as to provide an oxygen-containing exhaust gas bypass channel through which the oxygen-containing exhaust gas is discharged in a manner to bypass the exhaust gas combustor.

In the present invention, the oxygen-containing exhaust gas bypass channel through which the oxygen-containing exhaust gas from the fuel cell stack is discharged to the outside in a manner to bypass the exhaust gas combustor is provided. In the structure, the flow rate of the oxygen-containing exhaust gas to be supplied to the exhaust gas combustor is suppressed to thereby suppress the flow rate of the exhaust gas discharged from the condenser and increase the flow rate of the oxygen-containing gas supplied to the fuel cell stack. Accordingly, it is possible to maintain the water self-sustaining operation and avoid damage to the fuel cell stack, and it is also possible to avoid occurrence of degradation of emission and/or accidental fire in the exhaust gas combustor.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a view of parameters and variables used for explaining operation; and

DESCRIPTION OF THE PREFERRED EMBODIMENTS

[Structure]

Figure 1:
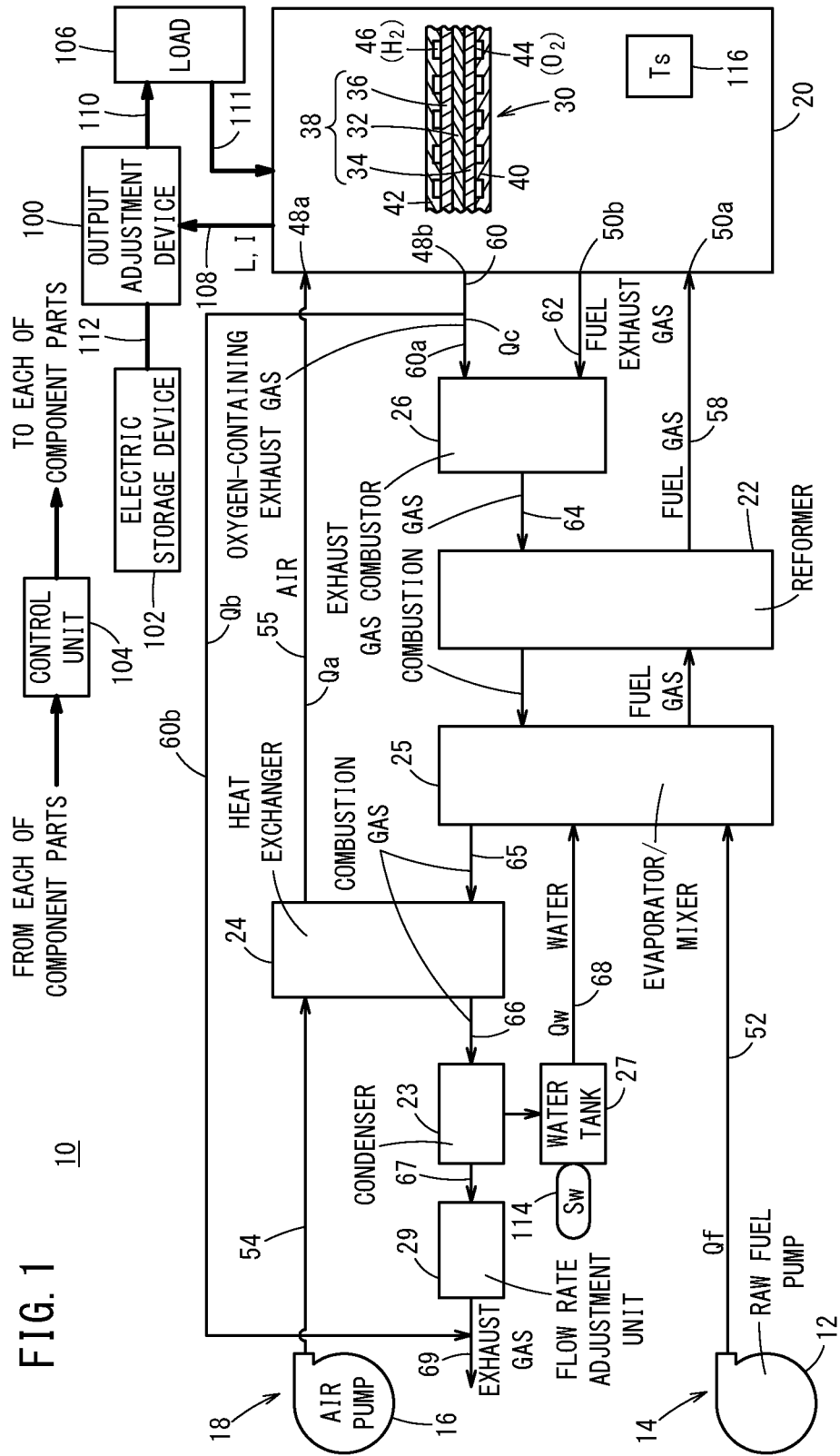
FIG. 1 is a diagram schematically showing structure of a fuel cell system according to an embodiment of the present invention.

A fuel cell system 10 according to an embodiment of the present invention shown in FIG. 1 is used in a stationary application. Additionally, the fuel cell system 10 may be used in various applications. For example, the fuel cell system 10 is mounted in a vehicle. A raw fuel supply apparatus (including a raw fuel pump 12) 14 for supplying raw fuel (e.g., city gas) and an oxygen-containing gas supply apparatus (including an air pump 16) 18 for supplying an oxygen-containing gas are connected to the fuel cell system 10.

Further, the fuel cell system 10 includes a stack type fuel cell stack 20, a reformer 22, a condenser 23, a heat exchanger 24, an evaporator/mixer 25, an exhaust gas combustor 26, and a water tank 27.

Further, the fuel cell system 10 includes an output adjustment device 100 for supplying electrical energy to a load 106, an electric storage device 102, and a control unit 104.

The fuel cell system 10 generates electrical energy required by the load 106 under control of the control unit 104, and supplies the electrical energy to the load 106 through the output adjustment device 100.

The fuel cell stack 20 includes solid oxide fuel cells (fuel cells) 30 for generating electrical energy in an electrochemical reactions of a fuel gas (gas obtained by mixing a hydrogen gas with methane, and carbon monoxide), and an oxygen-containing gas (the air). A plurality of the fuel cells 30 are stacked together.

The fuel cell 30 includes an electrolyte electrode assembly (MEA) 38 including an electrolyte 32, and a cathode 34 and an anode 36 provided on both sides of the electrolyte 32. The electrolyte 32 is made of oxide ion conductor such as stabilized zirconia.

A cathode side separator 40 and an anode side separator 42 are provided on both sides of the electrolyte electrode assembly 38. An oxygen-containing gas flow field 44 for supplying the oxygen-containing gas to the cathode 34 is formed on the cathode side separator 40, and a fuel gas flow field 46 for supplying the fuel gas to the anode 36 is formed on the anode side separator 42. It should be noted that, it is possible to use, as the fuel cell 30, any of various types of conventional SOFCs.

The fuel cell 30 is operated at an operating temperature of several hundred degrees (° C.), and a fuel gas (hydrogen) which has been reformed at the reformer 22 is supplied to the anode 36.

An oxygen-containing gas supply passage 48a and an oxygen-containing gas discharge passage 48b are provided in the fuel cell stack 20. The oxygen-containing gas supply passage 48a is connected to an inlet side of each oxygen-containing gas flow field 44, and the oxygen-containing gas discharge passage 48b is connected to an outlet side of each oxygen-containing gas flow field 44. The oxygen-containing gas supply passage 48a and the oxygen-containing gas discharge passage 48b extend through the fuel cell stack 20 in the stacking direction.

A fuel gas supply passage 50a and a fuel gas discharge passage 50b are provided in the fuel cell stack 20. The fuel gas supply passage 50a is connected to an inlet side of each fuel gas flow field 46, and the fuel gas discharge passage 50b is connected to an outlet side of the fuel gas flow field 46. The fuel gas supply passage 50a and the fuel gas discharge passage 50b extend through the fuel cell stack 20 in the stacking direction.

The evaporator/mixer 25 is made up of an evaporator and a mixer. The evaporator turns the water into water vapor. The mixer mixes raw fuel chiefly containing hydrocarbon with water vapor, and supplies the resulting gas as a fuel gas to the reformer 22.

That is, the evaporator/mixer 25 evaporates the water supplied from the water tank 27 to produce water vapor by the heat absorbed from the combustion gas supplied from the exhaust gas combustor 26.

The reformer 22 includes a reforming catalyst. The reformer 22 reforms a fuel gas mixed with water vapor to produce the fuel gas supplied to the fuel cell stack 20.

The heat exchanger 24 heats the oxygen-containing gas by heat exchange with the combustion gas supplied through the evaporator in the evaporator/mixer 25, and supplies the heated oxygen-containing gas to the fuel cell stack 20.

The exhaust gas combustor 26 combusts the fuel exhaust gas which is the fuel gas discharged from the fuel cell stack 20 and the oxygen-containing exhaust gas which is the oxygen-containing gas discharged from the fuel cell stack 20 to produce a hot combustion gas, and supplies the combustion gas to the evaporator in the evaporator/mixer 25 through the reformer 22.

The condenser 23 liquefies the overheated water vapor contained in the combustion gas supplied through the evaporator/mixer 25 and the heat exchanger 24, collects the water into the water tank 27, and discharges the heat as the exhaust gas to the outside through an exhaust gas channel 67, a flow rate adjustment unit 29, and an exhaust gas channel 69.

The raw fuel supply apparatus 14 includes a raw fuel supply channel 52 for supplying the raw fuel to the mixer in the evaporator/mixer 25.

The oxygen-containing gas supply apparatus 18 includes an oxygen-containing gas supply channel 54 for supplying the oxygen-containing gas to the heat exchanger 24, and an oxygen-containing gas supply channel 55 for supplying the oxygen-containing gas which has been subjected to heat exchange at the heat exchanger 24 to the oxygen-containing gas supply passage 48a of the fuel cell stack 20.

One end of the oxygen-containing exhaust gas channel (exhaust gas outlet) 60 is connected to the oxygen-containing gas discharge passage 48b of the fuel cell stack 20, and the other end of the oxygen-containing exhaust gas channel 60 is branched into an oxygen-containing exhaust gas channel 60a and an oxygen-containing exhaust gas channel (oxygen-containing exhaust gas bypass channel) 60b. The oxygen-containing exhaust gas channel 60a is connected to the exhaust gas combustor 26, and the oxygen-containing exhaust gas channel (oxygen-containing exhaust gas bypass channel) 60b is connected to the exhaust gas channel 69.

One end of a combustion gas channel 64 is connected to an outlet side of the exhaust gas combustor 26, and the other end of the combustion gas channel 64 is connected to the evaporator/mixer 25 through the reformer 22.

One end of a combustion gas channel 65 is connected to an outlet side of the evaporator/mixer 25, and the other end of the combustion gas channel 65 is connected to an inlet side of the heat exchanger 24.

The exhaust gas channel 66 for discharging the combustion gas (exhaust gas) consumed in heat exchange with the oxygen-containing gas is connected to an outlet side of the heat exchanger 24. The condenser 23 is disposed in the middle of the exhaust gas channel 66. One end of the exhaust gas channel 67 is connected to an exhaust side of the condenser 23, and the other end of the exhaust gas channel 67 is connected to an inlet side of the flow rate adjustment unit 29. An outlet side of the flow rate adjustment unit 29 and an outlet side of the oxygen-containing exhaust gas bypass channel 60b are merged together, and the oxygen-containing exhaust gas and the exhaust gas (exhaust gas of the combustion gas) are released to the outside through the exhaust gas channel 69.

A water supply channel 68 is connected to an inlet side of the evaporator/mixer 25, and the reformer 22 is connected to an outlet side of the evaporator/mixer 25.

A fuel gas supply channel 58 for supplying the fuel gas to the fuel gas supply passage 50a of the fuel cell stack 20 is connected to the reformer 22.

The fuel cell system 10 generates electrical energy required for the load 106 (hereinafter referred to as the "required power generation output Ld"), and supplies, as the power generation output L, the power generation current (hereinafter referred to as the output current) I, from one end of the stacked fuel cells 30 (i.e., the end plate (not shown) at one end in the stacking direction connected to the cathode 34 at one end of the fuel cell stack 20) through an electric circuit 108, the output adjustment device 100, and an electric circuit 110, to one end (active side) of the load 106. The other end (cold side, ground side) of the load 106 is connected to the anode 36 through an electric circuit 111 and via an end plate (not shown) at the other end in the stacking direction connected to the anode 36. It should be noted that the electric paths outside the fuel cell stack 20 such as the electric circuit 108 are denoted by thick bold lines.

The output adjustment device 100 supplies excessive power generation electrical energy of the power generation output L (power generation current I×power generation voltage) to one end (active side) of the electric storage device 102 through an electric circuit 112. The other end (cold side, ground side) of the electric storage device 102 is connected to the anode 36 through an electric circuit (not shown) and the end plate at the other end.

For example, the control unit 104 is made up of an ECU (electric control unit) having a CPU, a storage device (storage unit), and various input/output interfaces. Based on input (electrical signal) from each of component parts, the control unit 104 executes a program stored in part of the storage device in the ECU, and outputs a control signal (electric signal) to each of the component parts.

Examples of the input from each of the component parts include required power generation output Ld of the load 106 set at an output setting unit (not shown) of the fuel cell system 10, water tank storage quantity (also referred to as the "water quantity", the "detected water quantity") Sw detected by the water quantity sensor 114 provided at the water tank 27, the water flow rate Qw supplied from a pump (not shown) provided at the water tank 27 to the evaporator/mixer 25 through the water supply channel 68, the stack temperature (hereinafter also referred to as the "temperature", the "detected temperature") Ts detected by a temperature sensor 116 disposed adjacent to the oxygen-containing gas discharge passage 48b in the fuel cell stack 20, power generation current I detected by a current sensor (not shown) disposed in the electric circuit 108, power generation voltage detected by a voltages sensor (not shown) disposed in the electric circuit 108, an electrical signal corresponding to the flow rate of air discharged from the air pump 16 (in the embodiment, the air flow rate Qa of the air flowing through the oxygen-containing gas supply channel 54), an electrical signal indicating the flow rate (the raw fuel flow rate, the fuel flow rate) Qf of the raw fuel discharged from the raw fuel pump 12, an electrical signal indicating the SOC (state of charge) of the electric storage device 102, etc.

Examples of control signals to each of the component parts include a signal for regulating the output adjustment device 100, command signals to the oxygen-containing gas supply apparatus 18 and the flow rate adjustment unit 29, for regulating the air flow rate Qa of air supplied from the air pump 16 to the oxygen-containing gas supply channel 54, and a command signal to the raw fuel supply apparatus 14 for regulating the raw fuel rate Qf of the raw fuel supplied from the raw fuel pump 12 to the raw fuel supply channel 52.

[Operation]

With regard to the operation of the fuel cell system 10 having the above structure, firstly, [General Power Generation Operation] will be described, and then, [Advantages Offered by Providing the Oxygen-Containing Exhaust Gas Bypass Channel 60b] will be described, and lastly, [Water Self-Sustaining Operation/Stack Temperature Control Operation] will be described. The operation is performed through the control unit 104. However, since it would be complicated to explain the operation with reference to the control unit 104 each time, reference to the control unit 104 will be omitted as necessary.

[General Power Generation Operation]

At the time of continuing power generation, the valve opening degree of the flow rate adjustment unit 29 is set in correspondence with the power generation output L. Under driving operation of the air pump 16, the air is supplied from the oxygen-containing gas supply apparatus 18 along the oxygen-containing gas supply channel 54 through the heat exchanger 24, to the oxygen-containing gas supply channel 55.

In the meanwhile, in the raw fuel supply apparatus 14, a raw fuel such as the city gas ($CH_4$, $C_2H_6$, $C_3H_8$, $C_4H_{10}$), for example, is supplied to the raw fuel supply channel 52 in correspondence with the power generation output L, under driving operation of the raw fuel pump 12.

The raw fuel is supplied into the evaporator/mixer 25. Further, water is supplied from the water tank 27 to the evaporator/mixer 25, and the hot combustion gas is supplied to the evaporator/mixer 25 through the reformer 22.

The evaporator/mixer 25 turns the water supplied from the water tank 27 into water vapor by the heat of the combustion gas, mixes the raw fuel with the water vapor, and then supplies the mixed gas as a fuel gas to the reformer 22.

The reformer 22 heats the fuel gas mixed with the water vapor by the combustion gas for inducing reforming reaction to produce hot reduction gas (fuel gas).

The hot reduction gas (fuel gas) is supplied to the fuel gas supply channel 58.

The hot air supplied from the air pump 16 passes through the oxygen-containing gas supply channel 54, the heat exchanger 24, and the oxygen-containing gas supply channel 55, flows through the oxygen-containing gas supply passage 48a, and then flows through the oxygen-containing gas flow field 44 of each fuel cell 30. The hot reduction gas (fuel gas) supplied to the fuel gas supply channel 58 flows through the fuel gas supply passage 50*a*, and then flows through the fuel gas flow field 46 of each fuel cell 30.

As a result, air is supplied to the cathode 34 of each fuel cell 30, and the fuel gas is supplied to the anode 36 of each fuel cell 30 to perform power generation by electrochemical reactions. Thus, the power generation electrical current I is supplied to the load 106 or the electric storage device 102 through the output adjustment device 100.

In the fuel cell stack 20, the hot reduction gas which has flowed through each fuel gas flow field 46 is discharged as the fuel exhaust gas from the fuel gas discharge passage 50*b* to a fuel exhaust gas channel 62, and is then introduced through the fuel exhaust gas channel 62 into the exhaust gas combustor 26.

Further, the hot air which has flowed through each oxygen-containing gas flow field 44 is discharged as the oxygen-containing exhaust gas from the oxygen-containing gas discharge passage 48*b* into the oxygen-containing exhaust gas channel 60. The oxygen-containing exhaust gas is introduced through the oxygen-containing exhaust gas channel 60*a* into the exhaust gas combustor 26, and some of the oxygen-containing exhaust gas is discharged as an exhaust gas through the oxygen-containing exhaust gas bypass channel 60*b*.

In the exhaust gas combustor 26, the air (oxygen-containing exhaust gas) and the reduction gas (fuel exhaust gas) are self-ignited, or ignited by ignition means (not shown), and combusted. The hot combustion gas containing overheated water vapor produced in the exhaust gas combustor 26 flows through the combustion gas channel 64, the reformer 22, the evaporator/mixer 25, the combustion gas channel 65, and the heat exchanger 24. Then, the hot combustion gas is supplied through the exhaust gas channel 66 to the condenser 23.

In the heat exchanger 24, the air supplied from the air pump 16 through the oxygen-containing gas supply channel 54 is heated by the combustion gas introduced into the heat exchanger 24. The combustion gas which has flowed through the heat exchanger 24 flows through the exhaust gas channel 66 into the condenser 23.

In the condenser 23, some of the water vapor contained in the combustion gas is cooled, liquefied, and then the liquefied water is discharged into the water tank 27. The combustion gas containing the remaining water vapor is discharged as the exhaust gas through the exhaust gas channel 67, the flow rate adjustment unit 29, and the exhaust gas channel 69.

Power generation operation of the fuel cell system 10 is continued in the manner as described above.

[Advantages Offered by Providing the Oxygen-Containing Exhaust Gas Bypass Channel 60*b*]

Next, for facilitating understanding of the present invention, the advantages/significance of the fuel cell system 10 offered by providing the oxygen-containing exhaust gas bypass channel 60*b* in the oxygen-containing exhaust gas channel 60 will be described.

Figure 2:
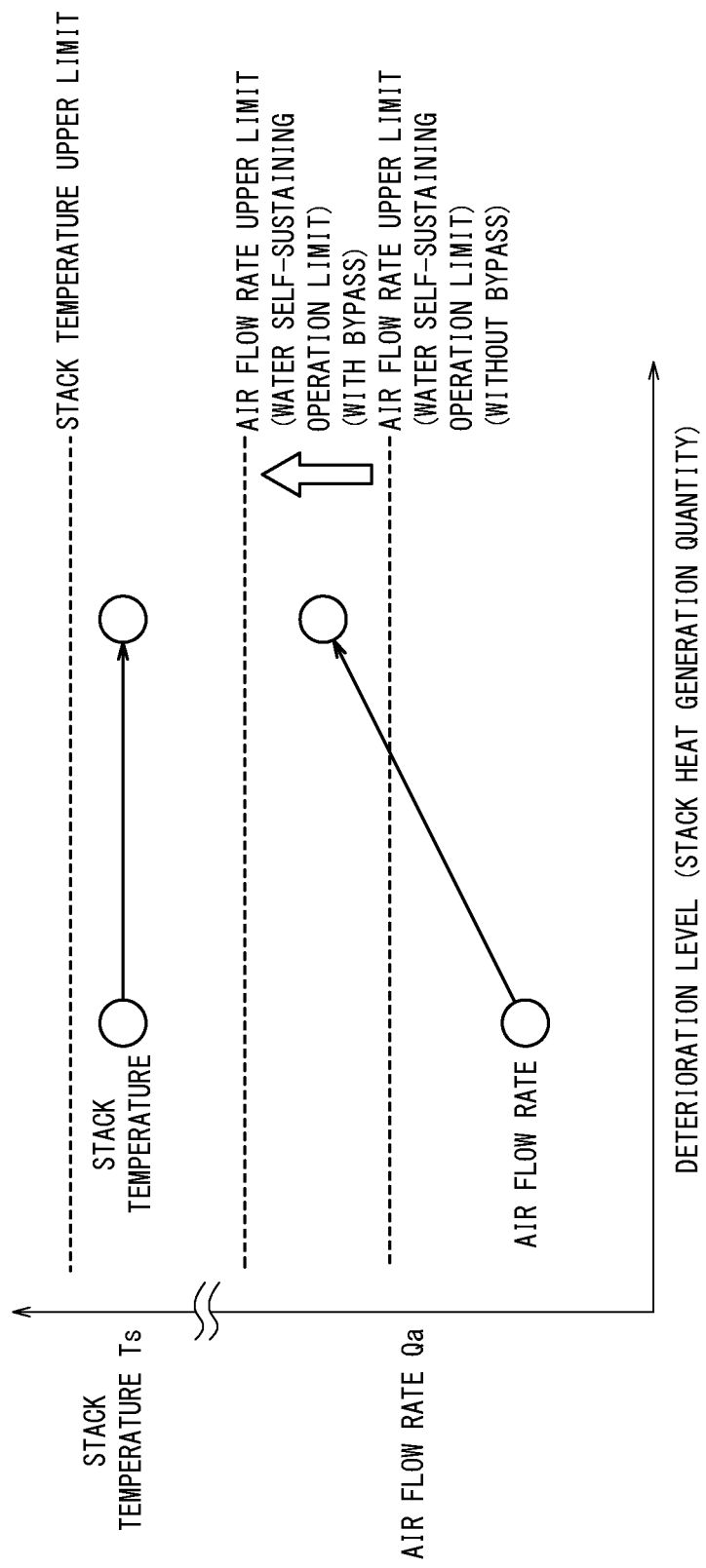
FIG. 2 is a graph showing water self-sustaining operation limit corresponding to the presence/absence of a bypass channel of an oxygen-containing exhaust gas.

As shown in FIG. 2, in general, as the fuel cell stack 20 becomes deteriorated, heat generation becomes increased. As such, the air flow rate Qa is increased to maintain the stack temperature Ts at an upper limit or less. However, the air flow rate may exceed the air flow rate upper limit (water self-sustaining operation limit) (referred to as the "without bypass" in the case where the oxygen-containing exhaust gas bypass channel 60*b* is not provided).

That is, in order to reduce damage to the fuel cell stack 20 by keeping the stack temperature Ts at a temperature not more than the upper limit, it is desirable to flow the air through the fuel cell 30 at a larger air flow rate Qa. However, if the air flow rate Qa is increased, the flow rate of combustion gas is increased and the quantity of saturated water vapor discharged as the exhaust gas from the condenser 23 is increased. As a result, the quantity of water condensed in the condenser 23 is decreased, and thus it is not allowed to increase the air flow rate Qa to the air flow rate upper limit (water self-sustaining operation limit) (without bypass) or more.

Figure 3:
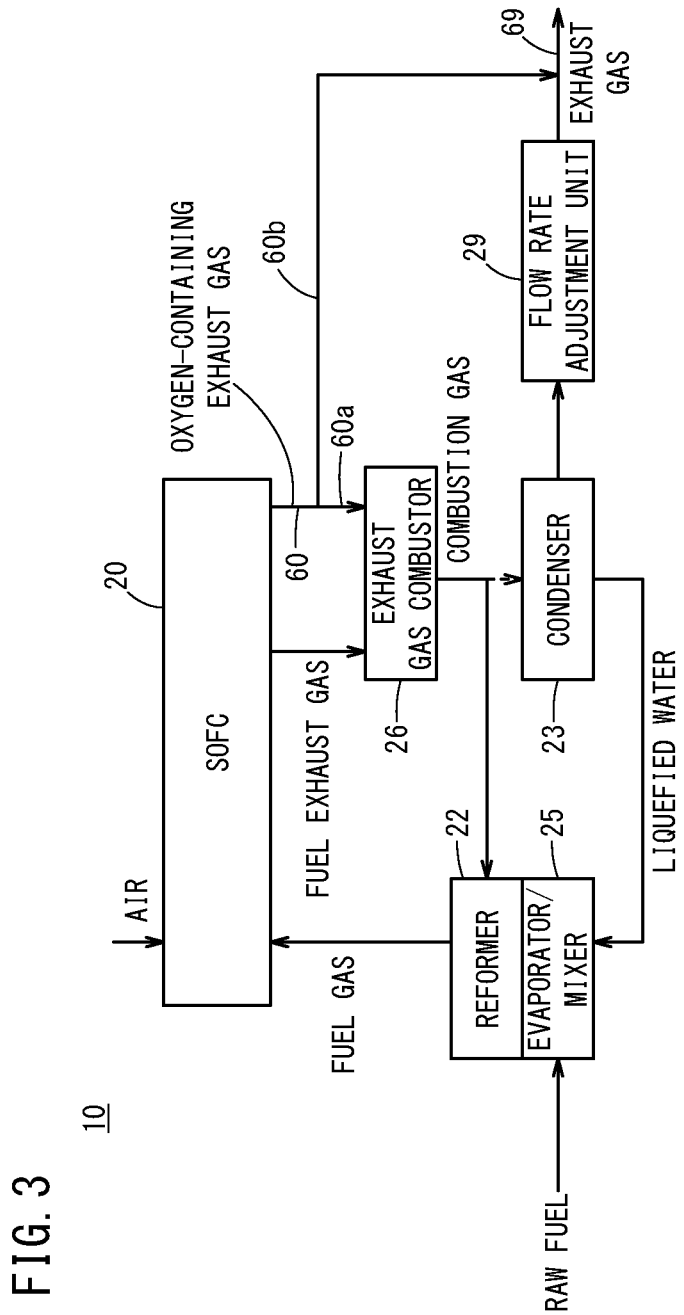
FIG. 3 is a diagram schematically showing a fuel cell system for explanation of water self-sustaining operation.

In order to deal with the above situation, in the fuel cell system 10 according to the embodiment of the present invention, as shown in a diagram of FIG. 3 (diagram for illustrating water self-sustaining operation) where water circulation is focused, the oxygen-containing exhaust gas bypass channel 60*b* (also see FIG. 1) configured to connect the oxygen-containing exhaust gas channel 60 of the fuel cell stack 20 to the exhaust gas channel 69 extending from the condenser 23 is provided, and the flow rate adjustment unit 29 such as the flow rate regulator valve is provided.

As described above, some of the oxygen-containing exhaust gas before combustion (dry hot gas) is caused to bypass the exhaust gas combustor 26 by using the oxygen-containing exhaust gas bypass channel 60*b*, and the exhaust gas flow rate of the exhaust gas flowing through the flow rate adjustment unit 29 is regulated so as to become low, for example, by the flow rate adjustment unit 29. In this manner, the bypass exhaust gas flow rate of the bypass exhaust gas passing through the oxygen-containing exhaust gas bypass channel 60*b* is increased, and the flow rate of the combustion gas (containing saturated water vapor) which passes through the condenser 23 and is then discharged from the exhaust gas channel 69 is decreased.

By providing the oxygen-containing exhaust gas bypass channel 60*b* as described above, as shown by a blank upward arrow in FIG. 2, the water self-sustaining operation limit for the air flow rate Qa is eased from (water self-sustaining operation limit) (without bypass) to (water self-sustaining operation limit) (with bypass), to thereby make it possible to collect a sufficient amount of water at the condenser 23.

Therefore, in the case where the fuel cell stack 20 is deteriorated over time and heat generation is increased, the air flow rate Qa of the air supplied to the fuel cell stack 20 is increased to thereby suppress raise in the temperature of the fuel cell stack 20, and at the same time, the increased amount of air is discharged through the oxygen-containing exhaust gas bypass channel 60*b*. In this manner, it is possible to ensure that water self-sustaining operation is performed.

Since it is possible to increase the air flow rate of the air supplied to the fuel cell stack 20 from the initial stage of operation of the fuel cell stack 20, it is possible to reduce (equalize) the stack temperature distribution, and extend the product life of the fuel cell stack 20. Further, since the flow rate of the oxygen-containing exhaust gas supplied to the exhaust gas combustor 26 is reduced, the combustion temperature is increased, and thus it is possible to suppress occurrence of degradation of emission and accidental fire.

Figure 4:
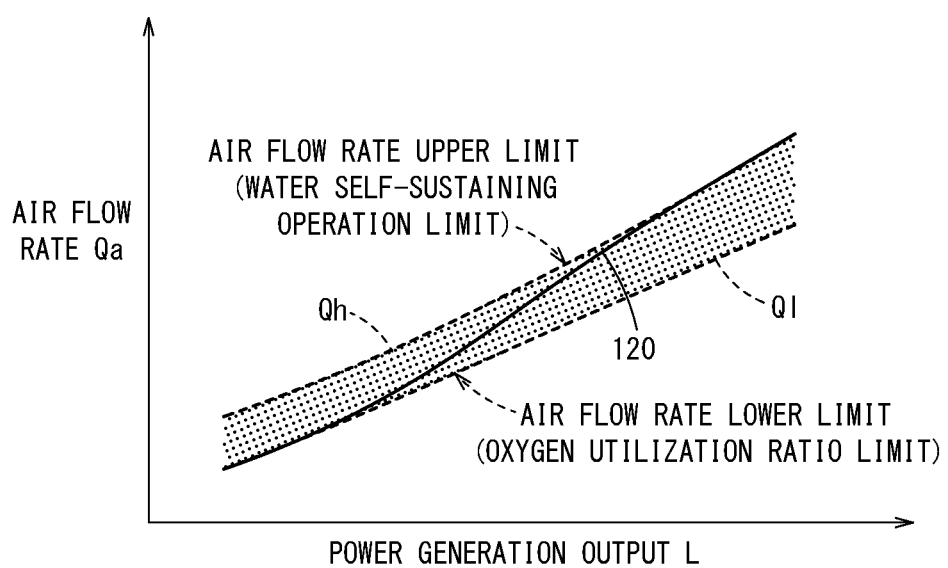
FIG. 4 is a graph of air flow rate characteristics indicating the air flow rate upper limit relative to the power generation output of the fuel cell system.

FIG. 4 is a graph showing the air flow rate characteristics (air flow rate map) 120 according to the embodiment, for determining the air flow rate Qa required for obtaining the power generation output L, the map being stored in a storage device (storage unit) of the control unit 104 beforehand.

The air flow rate characteristics 120 have good cost performance of the balance of plant (BOP: peripheral devices other than the fuel cell stack 20), which can be set in the fuel cell system 10 having the oxygen-containing exhaust gas bypass channel 60b.

The air flow rate Qa in the vertical axis represents the flow rate at which the air is supplied from the air pump 16, through the oxygen-containing gas supply channels 54, 55 and the oxygen-containing gas supply passage 48a, to the oxygen-containing gas flow field 44 formed in the cathode 34 of the fuel cell stack 20. It should be noted that the air flow rate Qa is controlled by the air pump 16.

Since the power generation output L in the horizontal axis is proportional to the air flow rate Qa, the air flow rate lower limit Ql corresponding to the upper limit (oxygen utilization ratio limit) of the set oxygen utilization ratio (ratio of the oxygen quantity of the oxygen consumed in power generation of the fuel cell stack 20 relative to the oxygen quantity of oxygen supplied to the fuel cell stack 20) Ro is determined.

When the fuel cell stack 20 is deteriorated, heat generation becomes large, and it is required to increase the air flow rate Qa for the same power generation output L.

However, when the air flow rate Qa is increased, the exhaust gas flow rate of the exhaust gas discharged from the condenser 23 is increased, and the water quantity discharged as the saturated water vapor is increased. Therefore, it becomes impossible to perform water self-sustaining operation for collecting and recirculating the water liquefied in the condenser 23.

In order to ensure that the water self-sustaining operation is performed, in the fuel cell system 10, the air flow rate upper limit Qh corresponding to the water self-sustaining operation limit (with bypass), in particular, in consideration of the product life of the fuel cell stack 20 is set.

Therefore, in the air flow rate characteristics 120 where BOP of the heat balance that can be adopted in the fuel cell system 10, according to the embodiment, having the oxygen-containing exhaust gas bypass channel 60b provided in parallel to the oxygen containing exhaust gas channel 60a is adopted, on the high power generation output L (high load) side, the flow rate in the flow rate adjustment unit 29 is reduced to thereby reduce the oxygen-containing exhaust gas flow rate Qc of the oxygen-containing exhaust gas flowing from the oxygen-containing exhaust gas channel 60a to the exhaust gas combustor 26, while the oxygen-containing exhaust gas flow rate (oxygen-containing exhaust gas bypass flow rate) Qb of the oxygen-containing exhaust gas flowing into the oxygen-containing exhaust gas bypass channel 60b is increased relatively. In this manner, the air flow rate Qa is maintained at a predetermined flow rate in correspondence with the power generation output L. In this case, since it is possible to reduce the quantity of the water vapor which is carried off by the exhaust gas of the combustion gas passing through the exhaust gas combustor 26, the reformer 22, the evaporator/mixer 25, and the heat exchanger 24 and further through the condenser 23, it is possible to collect a greater amount of water by the condenser 23 owing to the reduced water vapor quantity. Thus, it is possible not to exceed the air flow rate upper limit (water self-sustaining operation limit) Qh.

[Water Self-Sustaining Operation/Stack Temperature Control Operation]

Figure 5:
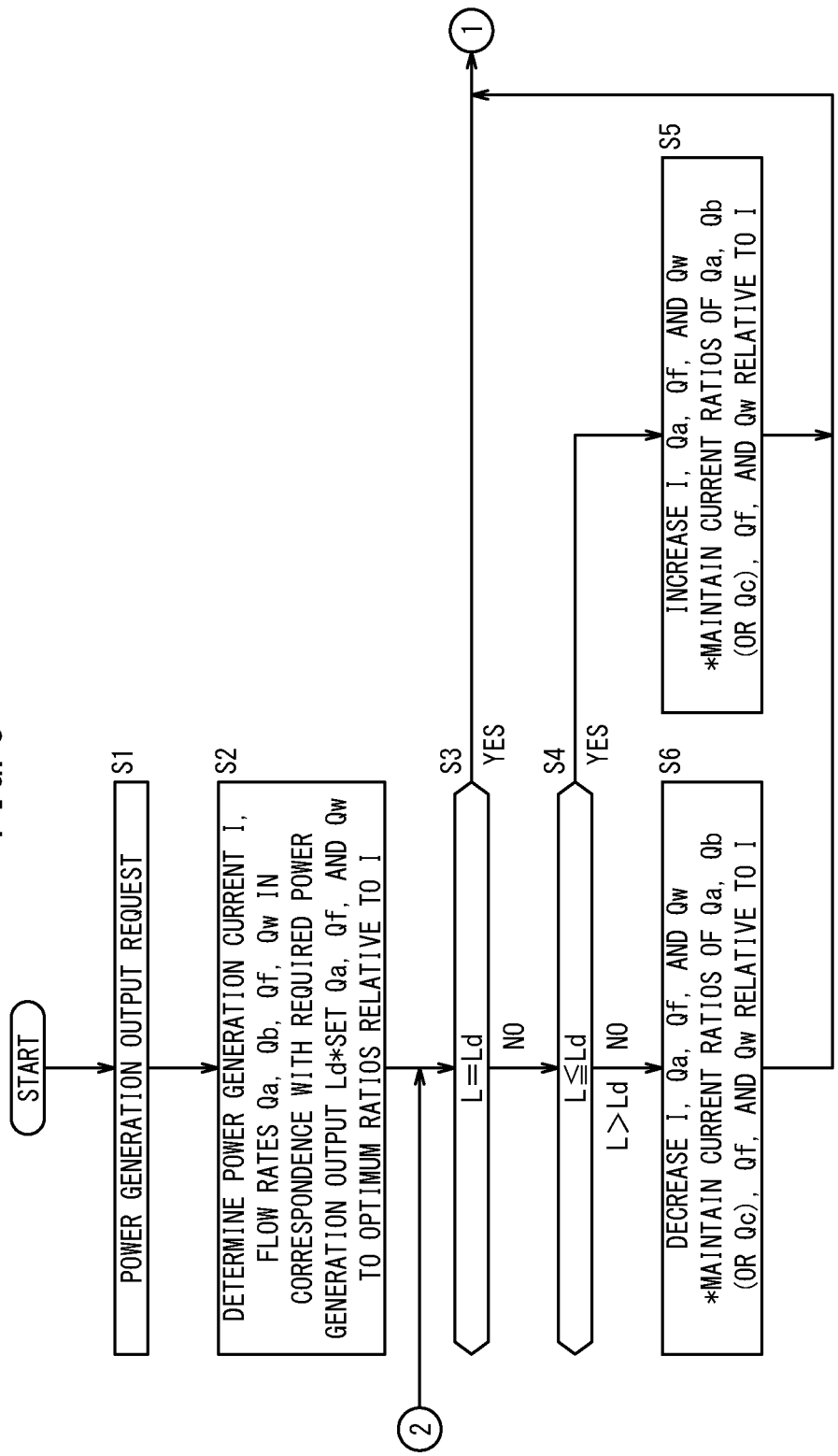
FIG. 5 is a flow chart (1/2) illustrating operation of the fuel cell system according to the embodiment.
Figure 6:
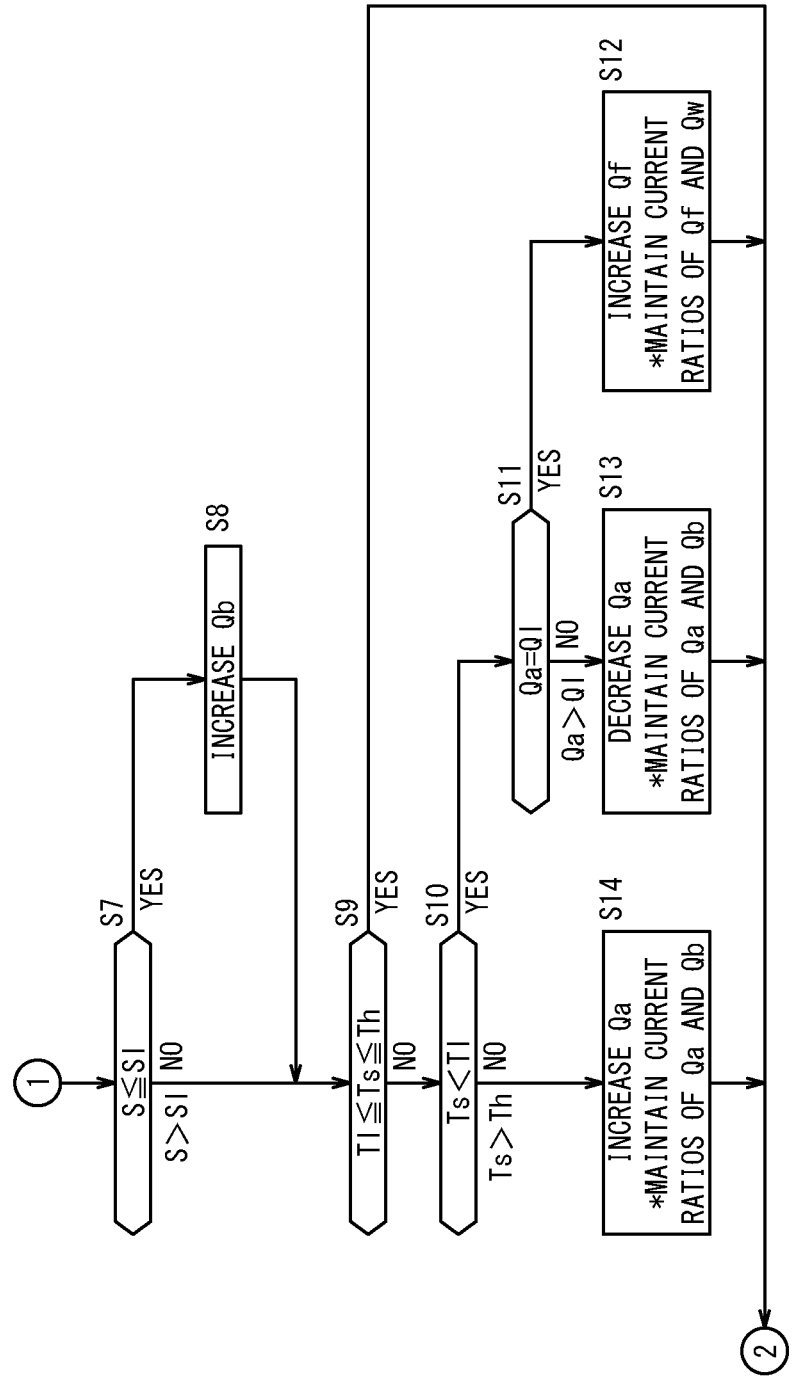
FIG. 6 is a flow chart (2/2) illustrating operation of a fuel cell system according to the embodiment.

Next, [Water Self-Sustaining Operation/Stack Temperature Control Operation] will be described. In this case, this operation will be described with reference to flow charts 1/2, 2/2 shown in FIGS. 5 and 6 corresponding to a program executed by the control unit 104. Since it would be complicated to explain the operation with reference to the control unit 104 each time, reference to the control unit 104 will be omitted as necessary.

FIG. 7 shows parameters and variables used for describing operation of each of the flow charts.

In the process according to the flow charts, in the entire preset range of the power generation output L (the lateral axis of the hatched area corresponding to the air flow rate characteristics 120 in FIG. 4), the air flow rate Qa is controlled to fall within the range of the hatched area in FIG. 4 between the air flow rate lower limit (oxygen utilization ratio limit) Ql and the air flow rate upper limit (water self-sustaining operation limit) Qh.

In step S1, the control unit 104 obtains the power generation output request to the load 106 based on control operation of an input device (not shown) (hereinafter referred to as the required power generation output Ld).

In step S2, the control unit 104 determines the power generation current I in correspondence with the required power generation output Ld, and determines the air flow rate Qa by referring to the air flow rate characteristics 120 (FIG. 4).

In this case, as described above, on the side where the power generation output of the fuel cell stack 20 is relatively high, in order to maintain the set air flow rate Qa and collect the water in the water tank 27, the oxygen-containing exhaust gas bypass flow rate Qb which is the flow rate of the oxygen-containing exhaust gas flowing through the oxygen-containing exhaust gas bypass channel 60b is increased, and the oxygen-containing exhaust gas flow rate Qc at which the oxygen-containing exhaust gas is supplied to the exhaust gas combustor 26 is decreased.

Further, optimum ratios of the fuel flow rate Qf and the water flow rate Qw relative to the power generation current I corresponding to the set air flow rate Qa are determined (set).

In step S3, the control unit 104 determines whether or not the power generation output L measured by the output adjustment device 100 is equal to the required power generation output Ld.

In the case where L≠Ld, i.e., the power generation output L is not equal to the required power generation output Ld (step S3: NO), in step S4, it is determined whether or not the power generation output L is not more than the required power generation output Ld (i.e., whether or not L≤Ld).

In the case where L≤Ld, i.e., the power generation output L is not more than the required power generation output Ld (step S4: YES), in step S5, the air flow rate Qa, the fuel flow rate Qf, and the water flow rate Qw are increased for increasing the power generation current I. It should be noted that the ratios of the flow rates Qa, Qb (or Qc), Qf, Qw relative to the power generation current I are maintained at the current ratios (in the first process, the ratios determined in step S2; in the second and the subsequent processes, the ratios when the routine returns to the process through a connector 2 in the flow chart).

In the meanwhile, in the determination of step S4, in the case where L>Ld, i.e., the power generation output L is larger than the required power generation output Ld (step S4: NO), in step S6, the air flow rate Qa, the fuel flow rate Qf, and the water flow rate Qw are decreased for reducing the power generation current I. It should be noted that, in this case also, the above described current ratios of the flow rates Qa, Qb (or Qc), Qf, Qw relative to the power generation current I are maintained.

In the above described step S3, in the case where L=Ld, i.e., the power generation output L is equal to the required power generation output Ld (step S3: YES), or in the case where the processes of steps S5 and S6 are finished, in step S7 (FIG. 6), it is determined whether or not the water tank storage quantity S is not more than the water self-sustaining operation alarming water quantity Sl (i.e., whether S≤Sl).

In the case where the water tank storage quantity S is less than the water self-sustaining operation alarming water quantity Sl (step S7: YES), i.e., in the case where, if control (power generation) is continued under the same condition, shortage or depletion of the water tank storage quantity S may occur, in step S8, the flow rate adjustment unit 29 reduces the flow rate of the exhaust gas passing through the flow rate adjustment unit 29 by a predetermined rate, to thereby increase the oxygen-containing exhaust gas bypass flow rate Qb accordingly, and the routine proceeds to step S9.

In the process of step S8, the quantity of water vapor which is carried off as the exhaust gas by the combustion gas passing the condenser 23 is decreased, and the amount of water commensurate with the reduced amount of the water vapor can be collected additionally into the water tank 27 by the condenser 23.

In the case where the condition of determination in step S7 is not satisfied (step S7: NO), i.e., in the case where the water tank storage quantity S in the water tank 27 is sufficient (S>Sl), the routine proceeds to step S9 without passing through step S8.

Then, in step S9, it is determined whether or not the stack temperature Ts falls within the temperature range between the stack temperature lower limit Tl and the stack temperature upper limit Th (i.e., whether Tl≤Ts≤Th).

In step S9, in the case where Tl≤Ts≤Th, i.e., the stack temperature Ts falls within the temperature range between the stack temperature lower limit Tl and the stack temperature upper limit Th (step S9: YES), the current ratios of the air flow rate Qa and the oxygen-containing exhaust gas bypass flow rate Qb are maintained without any changes, and the routine proceeds to step S3.

In step S9, in the case where the temperature falls out of the range (step S9: NO), in step S10, it is determined whether or not the stack temperature Ts is less than the stack temperature lower limit Tl.

In the case where Ts<Tl, i.e., the stack temperature Ts is below the stack temperature lower limit Tl (step S10: YES), then, in step S11, it is determined whether or not the air flow rate Qa is the air flow rate lower limit (oxygen utilization ratio limit) Ql.

In the case where Qa=Ql (step S11: YES), in order to increase the stack temperature Ts, since it is not possible to decrease the air flow rate Qa anymore in this case, in step S12, the flow rate of the raw fuel discharged from the raw fuel pump 12 is increased by a predetermined quantity to thereby increase the fuel gas flow rate Qf by a predetermined rate. By increasing the flow rate of the fuel gas (fuel flow rate) Qf and utilizing the combustion gas having the increased combustion temperature in the exhaust gas combustor 26, it is possible to increase the temperature of the fuel gas through the evaporator/mixer 25 and the reformer 22, and also increase the temperature of the oxygen-containing gas through the heat exchanger 24. As a result, it is possible to increase the stack temperature Ts of the fuel cell stack 20. In this case, the current ratios of the fuel flow rate Qf and the water flow rate Qw are maintained, and the routine proceeds to step S3.

In the case where the condition of determination in step S11 is not satisfied (Qa>Ql), in step S13, the air flow rate Qa is decreased by a predetermined rate. In this manner, by utilizing the combustion gas having the increased combustion temperature in the exhaust gas combustor 26, it is possible to increase the temperature of the fuel gas through the evaporator/mixer 25 and the reformer 22, and the temperature of the oxygen-containing gas through the heat exchanger 24, and also increase the raise in the air temperature by the heat generation in the fuel cell stack 20. Therefore, it is possible to increase the stack temperature Ts. In this case, the current ratios of the air flow rate Qa and the oxygen-containing exhaust gas bypass flow rate Qb are maintained without any changes, and the routine proceeds to step S3.

In the case where the condition of determination in the above described step S10 is not satisfied (Ts>Th), in step S14, while the current ratios of the air flow rate Qa and the oxygen-containing exhaust gas bypass flow rate Qb are maintained, the air flow rate Qa is increased to thereby decrease the stack temperature Ts of the fuel cell stack 20, and the routine proceeds to step S3.

In this case, the air flow rate Qa is increased by a predetermined rate so that the temperature of the fuel gas can be decreased by the combustion gas having the decreased combustion temperature in the exhaust gas combustor 26 through the evaporator/mixer 25 and the reformer 22, and the temperature of the oxygen-containing gas through the heat exchanger 24, and the raise in the air temperature by the heat generation in the fuel cell stack 20 can be decreased. Therefore, it is possible to decrease the stack temperature Ts.

[Modified Embodiment]

The following modification may be made. The constituent elements having the same structure as those of the above described embodiment are labeled with the same reference numerals, and only the differences will be described.

Figure 8:
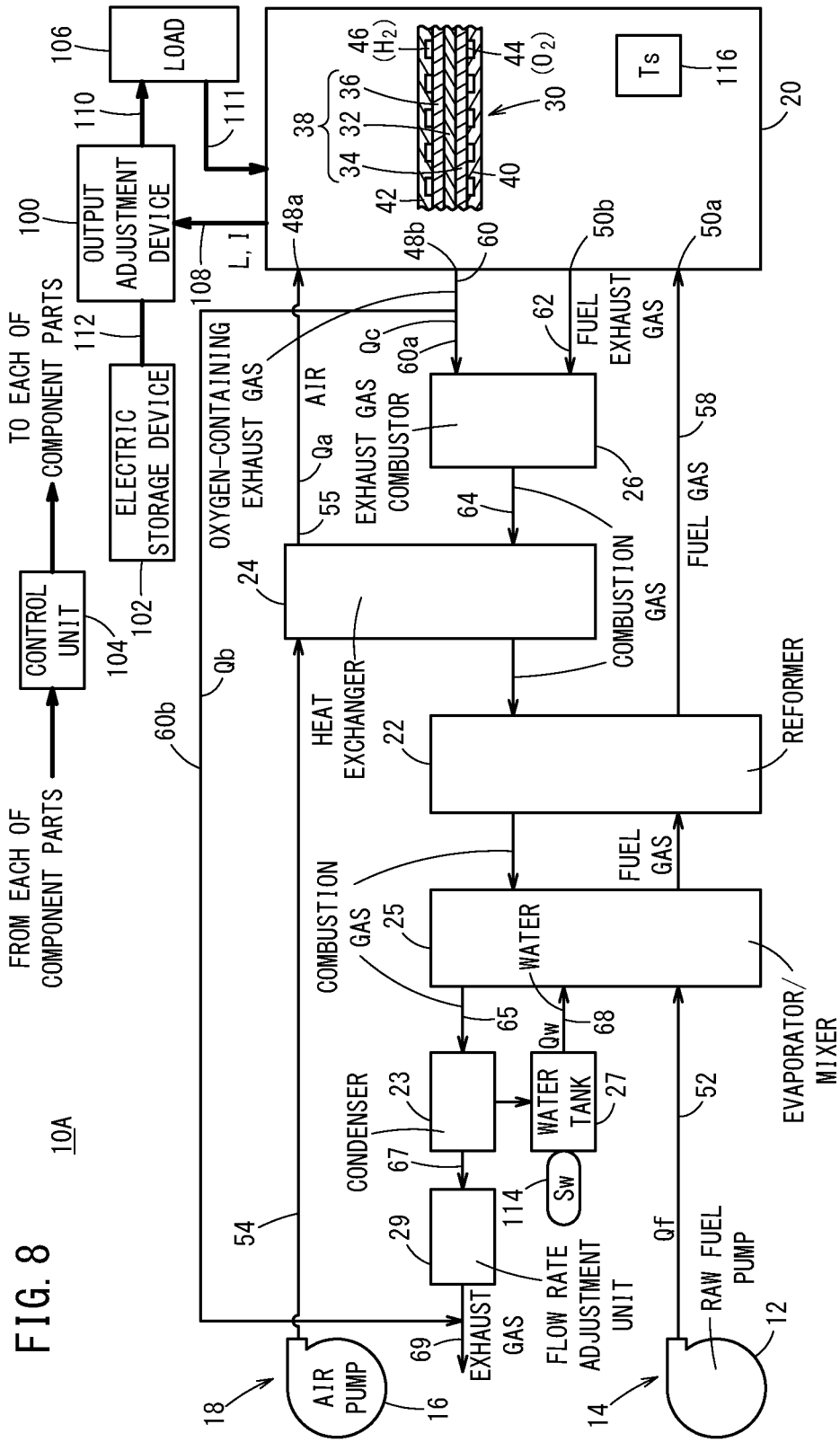
FIG. 8 is a diagram schematically showing structure of a fuel cell system according to a modified embodiment of the present invention.

FIG. 8 is a diagram showing structure of a fuel cell system 10A according to a modified embodiment. In the fuel cell system 10A according to this modified embodiment, the heat exchanger 24 is disposed between the exhaust gas combustor 26 and the reformer 22. In this fuel cell system 10A, since the temperature of the oxygen-containing gas can be increased, it is possible to suitably use the fuel cell system 10A in cold regions.

[Invention which can be Understood from the Embodiment and the Modified Embodiment]

Hereinafter, the invention which can be understood from the above embodiment and the modified embodiment will be described. For ease of understanding, the constituent elements are labeled with the reference numerals that are used in the above embodiment and the modified embodiment. However, the constituent elements are not limited to those labeled with the reference numerals.

The fuel cell system 10, 10A according to the present invention includes:

the fuel cell stack 20 including the plurality of fuel cells 30 stacked together, the fuel cells being configured to perform power generation by electrochemical reactions of the fuel gas and the oxygen-containing gas;

the reformer 22 configured to perform steam reforming of raw fuel chiefly containing hydrocarbon to generate the fuel gas supplied to the fuel cell stack 20;

the exhaust gas combustor 26 configured to generate a combustion gas by combusting the fuel exhaust gas and the oxygen-containing exhaust gas discharged from the fuel cell stack 20;

the heat exchanger 24 configured to perform heat exchange between the combustion gas and the oxygen-containing gas;

the oxygen-containing gas supply channel 55 configured to supply the oxygen-containing gas to the fuel cell stack 20 through the heat exchanger 24;

the condenser 23 configured to condense water vapor in the combustion gas and collect water; and the control unit 104 configured to control the power generation, and the supply channel through which the oxygen-containing exhaust gas discharged from the fuel cell stack 20 is supplied to the exhaust gas combustor 26 is branched so as to provide the oxygen-containing exhaust gas bypass channel 60b through which the oxygen-containing exhaust gas is discharged in a manner to bypass the exhaust gas combustor 26.

As described above, in the case where the stack heat generation quantity is increased due to deterioration of the fuel cell stack 20 over time, the oxygen-containing gas flow rate (air flow rate Qa) of the oxygen-containing gas supplied to the fuel cell stack 20 is increased to cool the fuel cell stack 20, and the oxygen-containing exhaust gas from the fuel cell stack 20 is caused to flow through the oxygen-containing exhaust gas bypass channel 60b for bypassing the exhaust gas combustor to thereby suppress the flow rate of the oxygen-containing exhaust gas supplied to the exhaust gas combustor 26, so that the flow rate of the exhaust gas discharged from the condenser 23 can be suppressed.

Since the exhaust gas flow rate of the exhaust gas which is discharged through the condenser 23 (saturated water vapor amount which is carried off) is suppressed, it becomes possible to suitably collect water at the condenser 23, and perform water self-sustaining operation.

Therefore, even if the fuel cell stack 20 is deteriorated over time, it is possible to avoid damage to the fuel cell stack 20, and perform water self-sustaining operation (see FIG. 2).

It should be noted that since it is possible to increase the air flow rate Qa from the initial stage of operation of the fuel cell stack 20, it is possible to reduce (equalize) the stack temperature distribution, and extend the product life of the fuel cell stack 20.

In this case, since the oxygen-containing exhaust gas flow rate of the oxygen-containing exhaust gas supplied to the exhaust gas combustor 26 is small, the combustion temperature in the exhaust gas combustor 26 is increased, and it is possible to reduce occurrence of degradation of emission and accidental fire.

The fuel cell system further includes the flow rate adjustment unit 29 configured to regulate the flow rate of the oxygen-containing exhaust gas supplied to the exhaust gas combustor 26. The control unit 104 is configured to increase the flow rate of the oxygen-containing exhaust gas branching off into the oxygen-containing exhaust gas bypass channel 60b by using the flow rate adjustment unit 29 to thereby increase the quantity of water collected at the condenser 23, when it is predicted that the quantity of water collected at the condenser 23 is decreased to be so small that water self-sustaining operation cannot be maintained.

In the structure, since the flow rate of the combustion gas containing the saturated water vapor supplied to the condenser 23 is decreased, the water vapor quantity of the water vapor carried off from the condenser 23 to the outside through the exhaust gas channel 67, the flow rate adjustment unit 29, and the exhaust gas channel 69 is decreased, and it is possible to increase the quantity of water collected at the condenser 23.

The fuel cell system further includes the storage unit configured to store characteristics defining the oxygen-containing gas flow rate lower limit Ql as the lower limit of the flow rate of the oxygen-containing gas relative to the power generation output L of the fuel cell stack 20; and the temperature sensor 116 configured to detect the stack temperature Ts of the fuel cell stack 20, and the control unit 104 is configured to increase the flow rate Qf of the fuel gas, when the stack temperature Ts is decreased below the threshold temperature T1 and the flow rate Qa of the oxygen-containing gas is at the oxygen-containing gas flow rate lower limit Ql (step S11: YES→step S12).

As described above, the flow rate of the fuel gas (fuel flow rate) Qf is increased to increase the combustion temperature of the combustion gas in the exhaust gas combustor 26. Utilizing the combustion gas, it is possible to increase the temperature of the fuel gas through the evaporator/mixer 25 and the reformer 22, and the temperature of the oxygen-containing gas through the heat exchanger 24. As a result, it is possible to increase the stack temperature Ts of the fuel cell stack 20.

Preferably, the fuel cell system further includes the output adjustment device 100 configured to be controlled by the control unit 104 and adjust the output current I to the load 106, and the control unit 104 is configured to increase the output current I when power generation output of the fuel cell stack 20 is smaller than the required power generation output Ld, and decrease the output current I when the power generation output L is larger than the required power generation output Ld.

In the structure, even if the power generation output L is decreased due to deterioration of the fuel cell stack 20, and even if the heat generation quantity relative to the power generation output L is increased, it is possible to regulate the output current I, and achieve the desired required power generation output Ld.

It is matter of course that the present invention is not limited to the above described embodiments, and can adopt various structures based on the description of this specification. For example, the flow rate adjustment unit 29 may be dispensed with, or the oxygen-containing exhaust gas bypass channel 60b may not be connected to (merged with) the exhaust gas channel 69, whereby the oxygen-containing exhaust gas is directly discharged.

What is claimed is:

1. A fuel cell system comprising:
   a fuel cell stack including a plurality of fuel cells stacked together, the fuel cells being configured to perform power generation by electrochemical reactions of a fuel gas and an oxygen-containing gas;
   a reformer configured to perform steam reforming of raw fuel chiefly containing hydrocarbon to generate the fuel gas supplied to the fuel cell stack;
   an exhaust gas combustor configured to generate a combustion gas by combusting a fuel exhaust gas and an oxygen-containing exhaust gas discharged from the fuel cell stack;
   a heat exchanger configured to perform heat exchange between the combustion gas and the oxygen-containing gas;
   an oxygen-containing gas supply channel configured to supply the oxygen-containing gas that is heated in the heat exchanger to the fuel cell stack, the heated oxygen-containing gas being discharged from the heat exchanger;
   a condenser configured to condense water vapor in the combustion gas and collect water; and
   a control unit configured to control the power generation, wherein a supply channel through which the oxygen-containing exhaust gas discharged from the fuel cell stack is supplied to the exhaust gas combustor is branched so as to provide an oxygen-containing exhaust gas bypass channel through which the oxygen-containing exhaust gas is discharged in a manner to bypass the exhaust gas combustor and the condenser.

2. The fuel cell system according to claim 1, further comprising a flow rate adjustment unit configured to regulate a flow rate of an oxygen-containing exhaust gas supplied to the exhaust gas combustor,
wherein the control unit is configured to increase the flow rate of the oxygen-containing exhaust gas branching off into the oxygen-containing exhaust gas bypass channel by using the flow rate adjustment unit to thereby increase a quantity of water collected at the condenser, when it is predicted that the quantity of water collected at the condenser is decreased to be so small that water self-sustaining operation cannot be maintained.

3. The fuel cell system according to claim 1, further comprising:
a storage unit configured to store characteristics defining an oxygen-containing gas flow rate lower limit as a lower limit of a flow rate of the oxygen-containing gas relative to power generation output of the fuel cell stack; and
a temperature sensor configured to detect a stack temperature of the fuel cell stack,
wherein the control unit is configured to increase a flow rate of the fuel gas, when the stack temperature is decreased below a threshold temperature and the flow rate of the oxygen-containing gas is at the oxygen-containing gas flow rate lower limit.

4. The fuel cell system according to claim 1, further comprising an output adjustment device configured to be controlled by the control unit and adjust an output current to a load,
wherein the control unit is configured to increase the output current when power generation output of the fuel cell stack is smaller than required power generation output; and
decrease the output current when the power generation output is larger than the required power generation output.

5. The fuel cell system according to claim 1, wherein each of the fuel cells is a solid oxide fuel cell.

6. A fuel cell system comprising:
a fuel cell stack including a plurality of fuel cells stacked together, the fuel cells being configured to perform power generation by electrochemical reactions of a fuel gas and an oxygen-containing gas;
a reformer configured to perform steam reforming of raw fuel chiefly containing hydrocarbon to generate the fuel gas supplied to the fuel cell stack;
an exhaust gas combustor configured to generate a combustion gas by combusting a fuel exhaust gas and an oxygen-containing exhaust gas discharged from the fuel cell stack;
a heat exchanger configured to perform heat exchange between the combustion gas and the oxygen-containing gas;
an oxygen-containing gas supply channel configured to supply the oxygen-containing gas to the fuel cell stack through the heat exchanger;
a condenser configured to condense water vapor in the combustion gas and collect water;
a flow rate adjustment unit disposed downstream of the condenser and configured to regulate a flow rate of the oxygen-containing exhaust gas supplied to the exhaust gas combustor; and
a control unit configured to control the power generation,
wherein a supply channel through which the oxygen-containing exhaust gas discharged from the fuel cell stack is supplied to the exhaust gas combustor is branched so as to provide an oxygen-containing exhaust gas bypass channel through which the oxygen-containing exhaust gas is discharged in a manner to bypass the exhaust gas combustor.

7. A fuel cell system comprising:
a fuel cell stack including a plurality of fuel cells stacked together, the fuel cells being configured to perform power generation by electrochemical reactions of a fuel gas and an oxygen-containing gas;
a reformer configured to perform steam reforming of raw fuel chiefly containing hydrocarbon to generate the fuel gas supplied to the fuel cell stack;
an exhaust gas combustor configured to generate a combustion gas by combusting a fuel exhaust gas and an oxygen-containing exhaust gas discharged from the fuel cell stack;
a heat exchanger configured to perform heat exchange between the combustion gas and the oxygen-containing gas;
an oxygen-containing gas supply channel configured to supply the oxygen-containing gas to the fuel cell stack through the heat exchanger;
a condenser configured to condense water vapor in the combustion gas and collect water;
a flow rate adjustment unit disposed downstream of the condenser and configured to regulate a flow rate of the oxygen-containing exhaust gas supplied to the exhaust gas combustor; and
a control unit configured to control the power generation,
wherein a supply channel through which the oxygen-containing exhaust gas discharged from the fuel cell stack is supplied to the exhaust gas combustor is branched so as to provide an oxygen-containing exhaust gas bypass channel through which the oxygen-containing exhaust gas is discharged in a manner to bypass the exhaust gas combustor, and
the control unit is configured to increase the flow rate of the oxygen-containing exhaust gas branching off into the oxygen-containing exhaust gas bypass channel by using the flow rate adjustment unit to thereby increase a quantity of water collected at the condenser, when it is predicted that the quantity of water collected at the condenser is decreased to be so small that water self-sustaining operation cannot be maintained.

* * * * *